(12) United States Patent
Clark

(10) Patent No.: US 8,382,943 B2
(45) Date of Patent: Feb. 26, 2013

(54) METHOD AND APPARATUS FOR THE SELECTIVE SEPARATION OF TWO LAYERS OF MATERIAL USING AN ULTRASHORT PULSE SOURCE OF ELECTROMAGNETIC RADIATION

(76) Inventor: William George Clark, Pittsford, NY (US)

( * ) Notice: Subject to any disclaimer, the term of this patent is extended or adjusted under 35 U.S.C. 154(b) by 407 days.

(21) Appl. No.: 12/604,761

(22) Filed: Oct. 23, 2009

(65) Prior Publication Data

US 2011/0095107 A1    Apr. 28, 2011

(51) Int. Cl.
*B32B 38/10* (2006.01)
(52) U.S. Cl. ........................................ 156/712
(58) Field of Classification Search ............... 156/712
See application file for complete search history.

(56) References Cited

U.S. PATENT DOCUMENTS

| 5,269,868 | A * | 12/1993 | Gofuku et al. | 156/718 |
| 5,895,589 | A * | 4/1999 | Rogers et al. | 219/121.76 |
| 6,521,068 | B1 * | 2/2003 | Menschig et al. | 156/83 |
| 6,558,493 | B1 * | 5/2003 | Ledger et al. | 156/98 |
| 6,770,838 | B1 * | 8/2004 | Clement et al. | 219/121.61 |
| 7,574,916 | B2 * | 8/2009 | Tillotson | 73/588 |
| 7,970,481 | B2 | 6/2011 | Milojevic et al. | |
| 2007/0051469 | A1 * | 3/2007 | Bossi et al. | 156/344 |

OTHER PUBLICATIONS

Eisenmenger, Wolfgagng, The Mechanisms of Stone Fragmentation in ESWL, 2001, World Federation for Ultrasound in Medicine & Biology, vol. 27, No. 5, pp. 683-693.*

* cited by examiner

*Primary Examiner* — Mark A Osele
(74) *Attorney, Agent, or Firm* — Stephen B. Salai, Esq.; Harter Secrest & Emery LLP

(57) ABSTRACT

A direct-write method, apparatus and end use device for selective separation of at least one layer of material from another layer of material at the interface between them using a beam of electromagnetic radiation from an ultrashort pulse source is disclosed.

1 Claim, 2 Drawing Sheets

METHOD AND APPARATUS FOR THE SELECTIVE SEPARATION OF TWO LAYERS OF MATERIAL USING AN ULTRASHORT PULSE SOURCE OF ELECTROMAGNETIC RADIATION

CROSS-REFERENCE TO RELATED APPLICATIONS

None.

STATEMENT REGARDING FEDERALLY SPONSORED RESEARCH OR DEVELOPMENT

None.

NAMES OF THE PARTIES TO A JOINT RESEARCH AGREEMENT

None.

REFERENCE TO A "SEQUENCE LISTING"

None.

BACKGROUND OF THE INVENTION

1. Field of the Invention

The present invention relates to a direct-write method and apparatus for the selective separation of one layer of material from another layer using an ultrashort pulse source of electromagnetic radiation.

2. Description of the Related Art

U.S. Pat. No. 7,528,342 by Dashi incorporated herein by reference in its entirety describes a method and apparatus for selective material removal of at least one layer of material on another using an ultrashort pulse laser. In this patent Dashi states "In ultrafast laser processing the threshold fluence of the material is clearly defined. Hence by controlling the pulsed laser fluence, material with lower threshold fluence can be selectively removed without ablating the underlying material of higher threshold fluence." Further along in the text Deshi states "It is not imperative that the entire overlying layer have a lower threshold fluence then the underlying layer (which should not be ablated). For precise machining, only the layer immediately above the underlying layer where the ablation/machining should stop, need to have the threshold fluence lowers (sic) than the underlying layer."

Thus Dashi relies on the well-known fact that a lower ablation threshold material can be removed from a higher ablation threshold material by precisely controlling the fluence of the light incident on the lower ablation material so that it ablates the lower ablation threshold material but not the higher ablation threshold material.

U.S. Pat. No. 6,333,485 by Haight, et al included herein in its entirety by reference produces a similar outcome as it is applied to the repair of an opaque defect on a photomask without damaging the underlying layer.

U.S. Pat. No. 6,159,832 by Mayer, included herein in its entirety by reference describes the precision deposition of electrically conducting film by the forward transfer of a metal onto a substrate.

U.S. Pat. No. 6,815,015 by Young incorporated herein in its entirety by reference, describes the advantages of direct-write and the forward transfer of a rheological fluid.

United States Patent Application 20080139075 by Birrell, et al incorporated herein in its entirety by reference describes deposition repair apparatus and methods that employ methods similar to U.S. Pat. Nos. 6,825,015 and 6,159,832.

These patents and patent applications rely on the precise, well defined difference in ablation threshold of the two layers to achieve to their objective. More specifically, they rely on the fact that the layer that is ablated has a threshold for ablation that is lower than that of the underlying substrate. And thus by arrange the incident fluence to be above the threshold for ablation of the layer removed and below the threshold for ablation of the underlying layer or substrate, it is possible to remove or separate the lower ablation threshold from the higher threshold ablation layer without damaging the underlying layer or substrate with the higher ablation threshold.

This condition misses an important understanding that is enabling in several identifiable situations and is the subject of this invention. When the threshold for ablation at the interface between two materials is lower than the threshold for ablation of the layers that form the interface, it is possible to induce the separation of one layer from another without expending as much energy as is needed when ablating the bulk. And thus by exceeding the threshold for ablation at the interface with an ultrashort pulse of electromagnetic radiation it is possible to achieve separation between two layers of material under conditions that imbue the process, the product, and consequently the end use device, with all the well-known benefits that accrue to the use of ultrashort pulses of electromagnetic radiation to separate layers of materials; benefits such as reduced heat affected zone (HAZ) reduced or eliminated recast layer, reduced splattering, undesirable delamination of adjacent layers or structures, the creation of microcracks, a well-defined and highly repeatable zone of separation of the two materials, and the highly deterministic precision and reproducability of the separation process.

An important additional benefit is the ability to create a zone of separation whose size is smaller, sometimes even substantially smaller, than the size of the beam incident on the interface. Thus, for example, in some situations it would be advantageous to use ablation at an interface to induce the forward transfer a layer of material of sub-micron dimensions to another surface by precisely controlling the fluence of the incident pulse such that only the very top of the spatial profile of the beam is above the threshold for ablation at the interface.

In some cases it is possible, and even desirable, to induce this separation by locally exceeding this threshold for ablation at the interface as, for example, when it is desirable to increase the rate of separation so that the one layer can be patterned more rapidly and thus with higher throughput and lower cost.

In addition, there are cases wherein it is possible to remove the higher ablation threshold material from the lower ablation threshold layer without damaging the lower ablation threshold layer or the material or structures adjacent to it, as is the case, for example, when it is desirable to use ultrashort pulses of radiation to ablated a thick layer of material with a higher ablation threshold from a lower ablation threshold polymer substrate. In this instance the higher ablation threshold layer of material may be first thinned to dimensions wherein an evanescent wave of sufficient energy to exceed the threshold for ablation at the interface builds up in the interface and causes the two layers of material to separate.

In paper M503 presented at the ICALEO Conference in 2006 titled "NANOSCALE ANALYSIS OF LASER ABLATED THIN FILMS USE IN INDUSTRIAL MANUFACTURING OF FLAT PANEL DISPLAYS" by Matt Henry, et al, incorporated herein by reference in its entirety, the authors briefly comment on several sources that might be used to pattern flat panel displays. With respect to using an ultrashort pulse of femtosecond or picosecond duration. The authors write state " . . . in all cases ultrafast lasers have relatively low pulse energies—in the order of 1 mJ. Thus to achieve thin film removal they are focused to fine spot sizes in the order of 10 μm to achieve sufficient energy density (Fluence). This makes them unsuitable for creating large area TCO structures at the commercial rates required for large area FPD manufacture, although smaller scale FPD applications such as OLED may be viable." Contrary to this statement this innovation clearly demonstrates that it is possible to create large area TCO structures at commercial rates in TCO films in the manufacture of devices such as touch screens and FPDs with pulse energy substantially below 1 mJ/pulse.

U.S. Pat. No. 5,652,083 by Kumar, et al, incorporated herein in its entirety by reference, describes a method for fabricating a display cathode by " . . . patterning and etching . . . " Clearly this patent refers to a chemical (wet etching) process. No mention is made of using an ultrashort pulse source that would imbue the method with all the benefits in quality that accrue to the use of this technology without having to employ wet etching process.

United States Patent Application 20050074974 incorporated herein in its entirety by reference, Stoltz describes " . . . methods and systems for ablation based material removal configuration for use in semiconductor manufacturing that includes the steps of generating an initial wavelength-swept-with-ti-me (sic) optical pulse in an optical pulse generator, amplifying the initial pulse, compressing the amplified pulse to a duration of less than about 10 picoseconds and applying the compressed optical pulse to the wafer surface, to remove material from, e.g., wafer surface." A " . . . wavelength-swept-in-time . . . " source is another way of describing a chirped pulse amplifier system known to those skilled in the art of laser source technology whose invention is attributed to Donna Strickland and Gerard Mourou, Optics Communications, Volume 56, Issue 3, 1 Dec. 1985, Pages 219-221. This application focuses on semiconductor materials and makes no mention of TCO on transparent substrates, nor does it make use of the fact that the threshold for ablation is lower at an interface compared to the threshold for ablation of the bulk material.

United States Patent Application 20050226287 incorporated herein in its entirety by reference, reads in part "Often, portions of such layers must be removed and/or inspected, while causing minimal damage to the underlying substrate. In such cases, the optimal choice of laser wavelength often depends upon the nature of the substrate material. In the case of a thin target layer (or layers) on a transparent substrate, near IR femtosecond pulses may be preferred since they can be precisely focused upon the target layer without interacting with the transparent substrate (whereas linear absorption might be significant when using a UV source). In the case of a thin transparent layer (or layers) on an opaque substrate, UV femtosecond pulses may be preferred because of their high absorption coefficient (and correspondingly thin optical penetration depth) thereby confining energy deposition to a thin layer at the surface." Again, this application relies on the threshold of ablation at the surface rather than at the interface between two surfaces.

As noted in United States Patent Applications 20090107707 and 20090107707, a conductive paste containing mainly metal powder and is widely used in electronic device components since it shows excellent conductive properties and for example, is used as material for an electrically-conductive path when forming an electric circuit on a wiring board, display or touch screen. The conductive paste is produced in the form of a paste by dispersing metal powder and glass frit in an organic vehicle. This conductive paste is applied to a ceramic, glass substrate or the like by screen printing or the like so as to form a wiring pattern. When the conductive paste is sintered at high temperatures, the organic vehicle evaporates and the metal powder is sintered so as to form a continuous film. Such conductive pastes provide excellent conductive properties since the metal powder is sintered to form a continuous solid film.

United States Patent Application 20080128397 incorporated herein in its entirety by reference makes no mention of employing the lower threshold for ablation at the interface or the evanescent wave propagating into the interface to separate one layer of material from another.

Kasuga, et al in U.S. Pat. No. 7,198,736 writes "A conductive silver paste including silver powders is printed on a surface of a base material using various types of printing methods, or is applied thereon using various types of coating methods, dried, and is further heat-treated as required, thereby forming a conductive film such as a conductor wiring," and "As various types of electronic equipment are miniaturized, it is also required that the conductor wiring composed of the conductive film is made fine. For example, in a conductor wiring having a line shape, it is required that the line width of the conductor wiring and the space width between adjacent conductor wirings are respectively not more than 100 microns. In the future, it is predicted that the conductor wiring is required to be made finer," and "When the above-mentioned conductor wiring is formed by a screen printing method using the conductive silver paste, for example, a screen having a screen opening sufficiently smaller than the line width of the conductor wiring and the space width between the conductor wirings must be used in order to satisfactorily reproduce the fine plane shape. However, such a screen having a small opening is liable to be clogged with large-diameter silver powders having an average particle diameter of not less than 1 micron. When the screen is clogged, there occurs such inferior printing that the printed conductor wiring is scratchy and a line of the conductor wiring is broken halfway. Particularly in an edge portion of the conductor wiring, the granularity of sufficiently larger silver powders than the fine plane shape is noticeable, so that there also occurs such inferior printing that it is recognized that the edge portion of the conductor wiring is blurred."

Thus the drive toward smaller electronic components encounters a problem when attempting to screen print conductive paste material on a substrate to create conductive features such as wires with at least one dimension below about 100 microns. Kasuga, et al above referenced patent deals with using silver conductive paste composed of particles of smaller size. Here we apply this invention to shape sintered conductive pastes using standard production techniques and direct-write the pattern therein that in order to create features such as wires on sub-100 micron dimensions.

Medical implants are another area where the invention described herein will be useful. Here there is a continuous drive to fabricate devices such as electrode arrays that are smaller, with improved functionality and at the same time are robust enough to tolerate the stresses that are incurred during implantation. As an example, the electrode array of the cochlear implant consists of a bundle of platinum wires assembled by hand under a microscope. This fabrication induced stress compromises the plasticity of the platinum electrodes which can result in electrical breaks during the additional stress caused by surgical implantation in the scala tympani. Similarly electrode arrays that are implanted in the brain for use in the local detection and monitoring of brain waves, or for providing a signal to actuate or control a bionic device, would benefit from a precise and reliable method of fabrication that have minimal impact on brain tissue during implantation.

SUMMARY OF THE INVENTION

The following should be noted with respect to the disclosure herein:

1.) The use of prepositions, such as "on", "over", "below", "underlying", "under" and "top", are defined with respect to the plane of the surface of the material, regardless of the orientation in which the material is actually held.
2.) "Top" refers to surface next to the interface first encountered by the beam of electromagnetic radiation when incident on the material, regardless of the orientation in which the material is actually held or how many intervening layers the beam must pass through before arriving at the interface.
3.) The term "substrate" refers to one or more layers of material that are not removed.
4.) The term "damage" or "damaging" refers to the creation of an undesirable effect or effects that compromise or otherwise lessen the utility of the product that results from employing this invention.
5.) The term ultrashort pulse refers to a pulse of electromagnetic radiation, preferably but not limited to a wavelength region in the near infrared (near-IR) and with a pulse width of below 100 picoseconds, preferably below 10 picoseconds, and most preferably below 1 ps as measured at the full-width, half maximum of the peak power of the pulse.
6.) The term "separation" is meant to refer to the breaking of bonds that bind at least one layer of material to another to which it is attached at the interface between them.
7.) The terms "pattern" and "patterning" is meant to refer to the separation of one layer from another in a limited portion of the interface by scanning the beam in the plane of the interface at least once.
8.) The term "product" is meant to refer to the result of employing this invention that creates a structural, morphological, or chemical change in the multilayer structure.
9.) The phrase "end use device" is meant to refer to any product at least a portion of which is produced by the method or apparatus described in this invention.
10.) The phrase "zone of separation" is meant to refer to the area on the interface where application of this invention causes the layers to separate.
11.) The term "direct-write" is meant to refer to patterning a multilayer material by moving a beam of electromagnetic radiation on the interface between at least two layers in a manner that changes one or more of the chemical or physical properties thereby causing them to separate.
12.) TCO means Transparent Conducting Oxide Film.
13.) FPD means Flat Panel Display.
14.) PDP refers to Plasma Display Panels.

This disclosure describes a method and apparatus of separating one layer of material from another by deposition of energy at the boundary between them.

In one aspect this invention provides a method of separating at least one layer of material from a substrate by absorption of energy from an ultrashort pulse source of electromagnetic radiation at the interface between them.

In another aspect of the invention the detachment or removal is accomplished by ablation or by mechanically induced stress caused by absorption of energy from one or more pulses of electromagnetic radiation of ultrashort pulse duration at the interface between at least one layer of material and the substrate layer of material.

In yet another aspect of the invention the separation or removal of one layer from another is achieved by moving the ultrashort pulses of electromagnetic radiation incident on the interface in a predetermined, direct-write manner to create a desirable pattern of separation between the two layers in some regions and not in others.

In yet another aspect of the invention the separation or removal of one layer from another in a desired pattern is accomplished without damaging the substrate or features that are adjacent to the zone of separation.

In yet another aspect of the invention the removal of one layer from another in a desirable pattern is accomplished by controlling the energy of the pulse of electromagnetic radiation incident on the interface between at least two layers, by controlling the position of a focus of the beam of electromagnetic radiation relative to the plane of the interface, by the rate the beam of electromagnetic radiation is moved across the interface, by scanning the beam of electromagnetic radiation in a repetitive manner over the interface or a combination thereof.

In yet another aspect of this invention the pulse energy, pulse width, and wavelength of the electromagnetic radiation is controlled in a manner that determines the amount of energy applied to the interface between the two layers.

In yet another aspect of this invention the local separation of one layer from another is used to remove a transparent film from a substrate in order to expose surface of the underlying substrate without damaging it.

In yet another aspect of this invention the local separation of one layer from a substrate is use to pattern a transparent, electrically conductive film attached to an underlying substrate that is also transparent.

In yet another aspect of this invention the local separation of a layer is use to direct-write pattern a transparent, electrically conductive film attached to an underlying substrate that is also transparent in order to create a touch screen or display without the use of chemical etchants.

In yet another aspect of this invention the patterning enables the direct-write patterning of a product with a reduced number of processing steps.

In yet another aspect of this invention a relatively thick layer of conductive material such as a metal or conductive paste bonded to an electrically insulating substrate may be patterned in order to create electrically conductive paths or "wires" attached to a semiconductor or electrically insulating substrate.

In yet another aspect of this invention a relatively thick layer of conductive material such as a metal or conductive paste bonded to a semiconductor or electrically insulating substrate with a lower threshold of ablation may be patterned in order to create electrically conductive paths or "wires" attached to the substrate.

In yet another aspect of this invention a relatively thick layer of conductive material such as a metal or conductive paste bonded to a semiconductor or electrically insulating substrate with a lower threshold of ablation may be patterned in a direct-write manner in order to create electrically conductive paths or "wires" attached to the electrically insulating polymer substrate.

In yet another aspect of this invention a relatively thick layer of conductive material such as a metal or conductive paste bonded to an electrically insulating substrate with a lower threshold of ablation may be patterned in a direct-write manner in order to create electrically conductive paths or "wires" attached to the electrically insulating substrate without damaging the substrate or structures adjacent to the zone of separation.

In yet another aspect of this invention the separation is accomplished using a beam of electromagnetic radiation from a source generating pulses of ultrashort duration preferably using a gain medium comprising a rare-earth doped gain medium arranged in a fiber oscillator or combination oscillator/amplifier configuration operating in the chirped-pulse amplification regime.

In yet another aspect of the present invention a means of patterning one layer of material on another is provided for those cases where the ablation threshold of the material comprising both layers is higher than the fluence of the beam incident on the material.

In yet another aspect of the present invention a means of separating one layer of material from another at the boundary between them is provided wherein it is desirable to minimize chemical or physical damage to layers or structures adjacent to the zone of separation.

In yet another aspect of the present invention the fluence incident on the interface is precisely controlled to induce a separation of one layer from the other over dimensions smaller than the spot size of the electromagnetic radiation incident on the interface.

In yet another aspect of the present invention the fluence incident on the interface is precisely controlled to induce a separation of one layer from the other over dimensions smaller than the spot size of the electromagnetic radiation incident on the interface, thereby inducing the separated material to be transferred to a nearby surface.

In yet another aspect of the present invention the fluence incident on the interface is precisely controlled to induce a separation of an object from the substrate over dimensions smaller than the diffraction-limited spot size of the electromagnetic radiation incident on the interface, thereby inducing the object to be transferred to another object.

In yet another aspect of the present invention a pulse source of electromagnetic radiation preferably includes a mode-locked solid state laser. The pulsed beam of electromagnetic radiation most preferably has a pulse width between 10 fs and 1 ps but could also have a pulse duration between 1 fs and 100 ps if a somewhat lower quality product or end use device is acceptable. The repetition rate of this source most preferably would be between 1 kiloHertz (kHz) and 500 kHz, but could range between 10 Hz and 100 MHz. Control of the pulse energy, average power output, repetition rate may be provided by an electro-optic or acousto-optic device or both depending on the requirements of the application. The pulsed laser beam is preferably moved in a direct-write manner in at least a portion of the plane of the interface in a predetermined pattern by a one or two axis galvanometer (galvo) scanners under the control of a controller for the purpose of separating one layer from the substrate in a well-defined zone of separation. Galvo scanners are useful because they can move the beam very rapidly and their motion can be repeated over-and-over again, thereby allowing residual heating effects to either to accumulate or dissipate in one area before another layer of the material is removed at or near the same location. A drawback in the use of a galvo scanner when patterning large displays is that they cannot pattern a length or area more than about 10 centimeters. And so patterning materials over the large area such as required for large area displays requires that a smaller area be patterned rapidly using a galvo scanner, and the process repeated in an adjacent area, stitching each of these smaller patterned areas together to pattern the entire surface. This "step and repeat" processing approach can be achieved by a galvo scanner working in combination with a motor-driven mechanical stage under of a controller. Alternatively, the material is moved continuously in a manner that feeds fresh material in one side and finished material out the other while the galvo or combination galvo and mechanical assembly rapidly patterns a section within a more limited field-of-view. An alternative approach is to employ a mechanism similar to that used in a printer to raster scan the beam across a large area, turning the beam on and off when it is positioned in the precise location where separation of the two layers of material is desired.

Clearly, the controller must be able to control the motion of the scanner, the other mechanics and the operational parameters of the laser so that the desired pattern is generated as precisely and as quickly as possible. The beam would be preferably focused on the material using a focusing unit or lens, which is preferably a scanning lens, telecentric lens, F-theta lens, or Schwartzchild lens, as dictated by the specific needs of the application. The beam may be further tailored to the needs of the application either spatially or temporarily using apertures, diffractive optical elements, flat-top beam profile generators, adaptive optic assemblies such as a deformable mirror, a pulse shaper in order to provide temporal characteristics that, for example, minimize adverse heating effects, improve ablation efficiency, or structure the zone of separation as, for example, when it is desirable to create an extremely small feature.

The separated material may be at least partially removed by flowing a gas across the ablation zone. This gas flow system, when operating with a nearby vacuum port, can serve to help keep adjacent structures cool.

In applying this invention it is desirable to keep the fluence incident on the interface below the threshold that results in damage to surface of the substrate. In this regime the quality of the outcome is higher than would be achieved when the fluence is at or near the ablation threshold of the substrate. The quality of the outcome generally varies with the needs of the application, and so in some cases a lower quality might be acceptable if there is a gain in another beneficial aspect such as throughput. What might be considered a poor quality result in some applications would be fine in others.

Generally, the smaller the feature, the more desirable it is to operate in a fluence regime close to the threshold for material separation at the interface. But higher separation rates can be achieved when the incident fluence is 2 to 5 times the threshold for separation of the two layers of material.

It is sometimes desirable to remove most of the thickness of a layer of material to be removed from a substrate by directing an pulse of electromagnetic radiation with a fluence well above the threshold for ablation onto its surface, thereby creating an ablation plume that moves away from the surface in a direction opposite to the direction of propagation of the beam. The intensity of the evanescent electromagnetic wave propagating into the interface will build up as the material is thinned, eventually reaching a level where it exceeds the threshold for separation at the interface. Under these conditions the remaining thickness material will be separated from the substrate, leaving the substrate surface largely undamaged. Here the process relies on the fact that ablation at the interface results in the explosive removal of the thin layer of material attached to it. This method is advantageous since it enables the removal of a higher threshold of ablation material from a lower threshold of ablation material such as, for example, when removing a metal or conductive paste from a polymer substrate, as will be illustrated in Example #3.

With the present invention it is possible to produce a feature size in at least one dimension that is less than the spot size of the beam by precisely controlling the fluence incident on the interface relative to the threshold for ablation. The stability of the electromagnetic radiation from the ultrashort pulse source plays an important role in machining feature of this dimension with repeatability and precision. Here a higher precision, finer step resolution scanner such as a piezoelectric-based scanner might be more desirable than a galvo scanner, especially when the feature size is less than the diffraction-limited spot size of the beam.

In some cases it is desirable to match the wavelength of the electromagnetic radiation to the transparency or opacity of the layer and/or the substrate in order to lower its fluence at another, lower interface, thereby preventing the separation of a third layer of material on the second side of the substrate.

The present invention provides an improved method and apparatus for producing structural changes in multilayer materials by inducing ablation or stress at the interface between two layers, thereby causing them to locally separate from each other. The pulses of ultrashort duration are preferably generated by a diode-pumped, solid state laser such as a fiber oscillator, or in cases where more fluence is desired, in a fiber oscillator fiber amplifier configuration, fiber oscillator disc amplifier configuration, fiber oscillator bulk optic amplifier configuration, a bulk optical element oscillator/amplifier combination, or the equivalent. To minimize complexity and maximize robustness. It is also preferable that the gain medium of both the oscillator and amplifier be directly pumped by one or more semiconductor devices such as laser diode or diode arrays. It is also preferable that the gain medium be doped with a rare-earth element such as Ytterbium.

By precise control of the parameters of the beam incident on the interface it is possible to create features well below the spot size of the beam on the interface. This ability is desirable in an application such as that described in U.S. Pat. No. 6,159,832 by Mayer, incorporated herein in its entirety by reference.

In yet another preferred embodiment the beam of ultrashort pulses of light is caused to propagate to the target material by reflection and transmission through suitably arranged optics such as lenses and mirrors, and through shaping devices such as those previously described in order to shape the beam's spatial and/or temporal profile, polarization, fluence and position on the target material. A controller sets these parameters according to the requirements of the application. The controller may also move the beam in a manner that patterns the target material by the selective removal of one or more layers from an underlying substrate. All this is accomplished preferably with a minimum of damage to the underlying substrate, with minimum heat affected zone (HAZ) little or no hot splatter contamination to the field adjacent to the zone of separation, little or no change in plasticity or embrittlement of materials near the zone of separation and with extremely high precision, high yield, and high throughput. These are all desirable characteristics of structuring multilayer materials by the absorption of energy with ultrashort pulses of electromagnetic radiation at an interface.

DETAILED DESCRIPTION OF THE DRAWINGS

Figure 1:
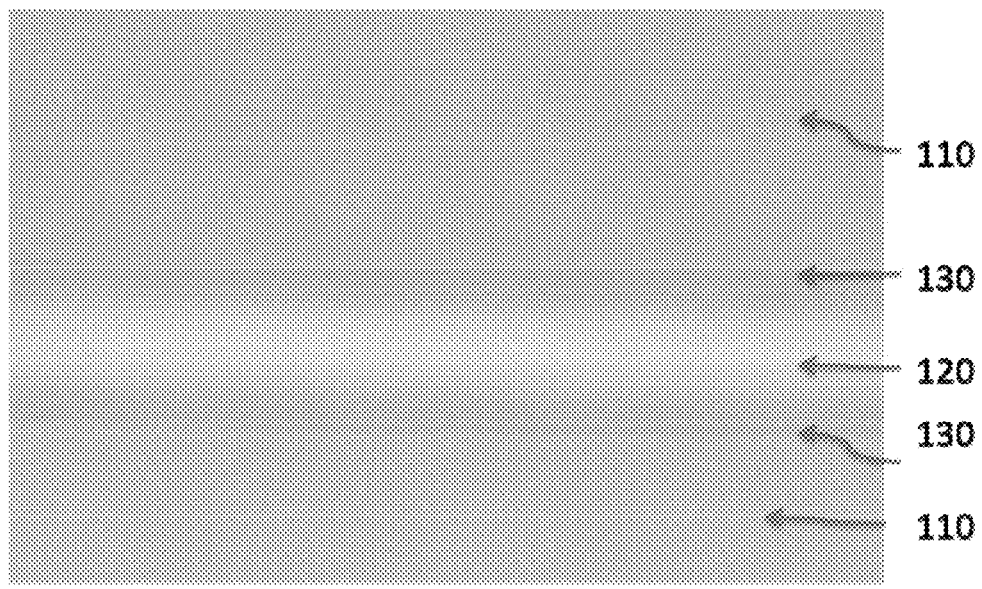
FIG. 1 is a scanning electron microscope (SEM) image of a layer of conductive, transparent material, in this case Indium-tin-oxide (ITO) removed from an underlying transparent layer.

FIG. 1 is a scanning electron microscope (SEM) photograph a multilayer material comprises a TCO film deposited on a transparent substrate that was processed using this invention. A multilayer material such as the one shown in this figure with a second layer of TCO on the other side of the glass plate may be used in an electronic device such as a touch screen. The upper and lower sections (110) in this photograph are both sections of TCO film that are electrically conductive and reasonably transparent over the entire visible wavelength range, with transmission in excess of 80% out to 1100 nm. The TCO layer (110) was removed from the underlying substrate (120) at a linear cut rate of 2 meters per second. The width of the area removed is about 20 microns. The removal of TCO was accomplished by absorption of a beam of electromagnetic radiation generated by a Ytterbium (Yb) doped fiber laser oscillator amplifier system capable of producing 20 Watts of average power output in a pulse duration in the range of 200 femtoseconds (Clark-MXR, Inc., Model IMPULSE.) Note that the edge of the TCO film (130) is clean and shows no evidence of delamination of the TCO adjacent to the removal zone (120). Note also that there is no evidence of surface damage to the substrate [the lighter band (130) in the center between the two edges of the TCO film is not damage to the substrate but rather an artifact of the SEM process. The substrate is a poor electrical conductor and so electrons further away from the conductive layer of TCO do not bleed off its surface as quickly as electrons closer to the edge of the TCO film.]

A variant on this process is to harmonically convert the fundamental wavelength of the incident electromagnetic radiation to shorter wavelengths such as the second harmonic (SHG), third harmonic (THG) and/or Fourth harmonic (FHG), or some combination thereof in order to reduce the fluence of electromagnetic radiation that reaches the interface on the other side of the multilayer structure, thereby minimizing damage to the interface on the other, second side of the substrate.

Figure 2:
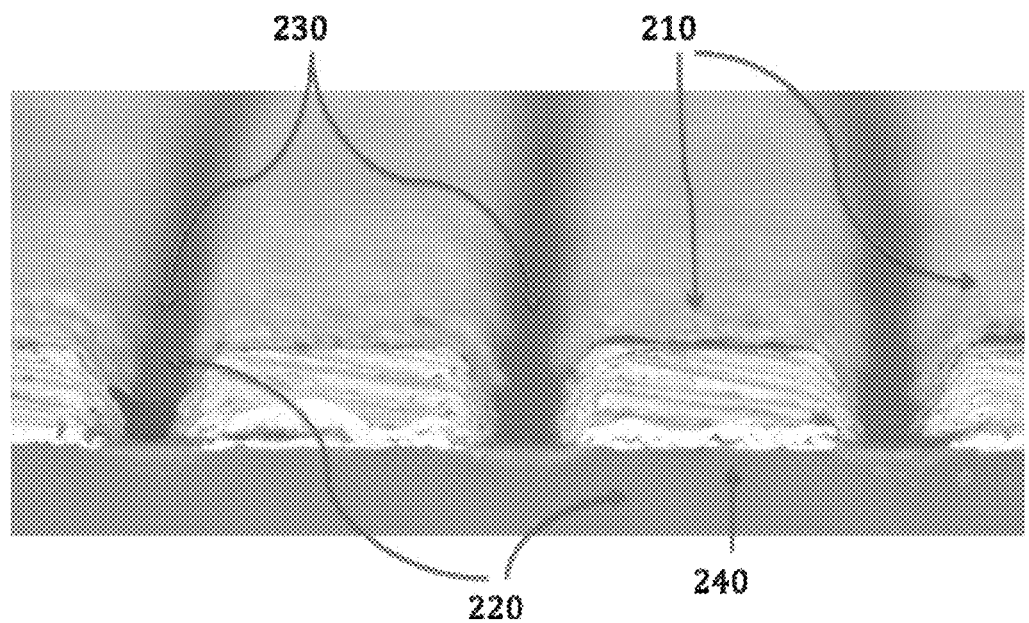
FIG. 2 is an SEM image of a layer of sintered silver conductive paste material on a substrate that has been patterned according to the invention described herein.

FIG. 2 is an SEM photograph of the end of a multilayer material that comprises sintered silver conductive paste (210) on a transparent, electrically-insulating substrate (220). The width of the conductive paste lines is about 45 microns and they are separated by a gap of about 5 micron gaps. This gap was machined into the paste to form these electrically conducting paths or "wires" using this invention. In this case the conductive paste was sufficiently thick (about 25 microns) that it first had to be thinned by multiple passes over the surface. As the thickness of the sintered conductive paste was thinned the evanescent wave propagating into the interface became stronger until the threshold for separation of the solid paste was exceeded, at which point the remaining paste material separated from the substrate in a manner that caused no apparent damage to the substrate's surface. Note that the remaining conductive paste "wires" formed by this process remain well attached to the underlying substrate (240) and that there is no apparent delamination or damage to the surface of the substrate where the conductive paste was removed (230.) This is evidence that the invention described here is capable of singulating or carving out very thin wires, possibly as small as a few microns, from sintered conductive paste without damaging the substrate or structures near the zone of separation. This is a very desirable outcome when the reliability of the end use device depends on preserving the plasticity of the conductive material and the substrate to which it is attached. It would be hard, maybe even impossible, to duplicate this ability to structure this kind of material on these dimensions any other way.

Figure 3:
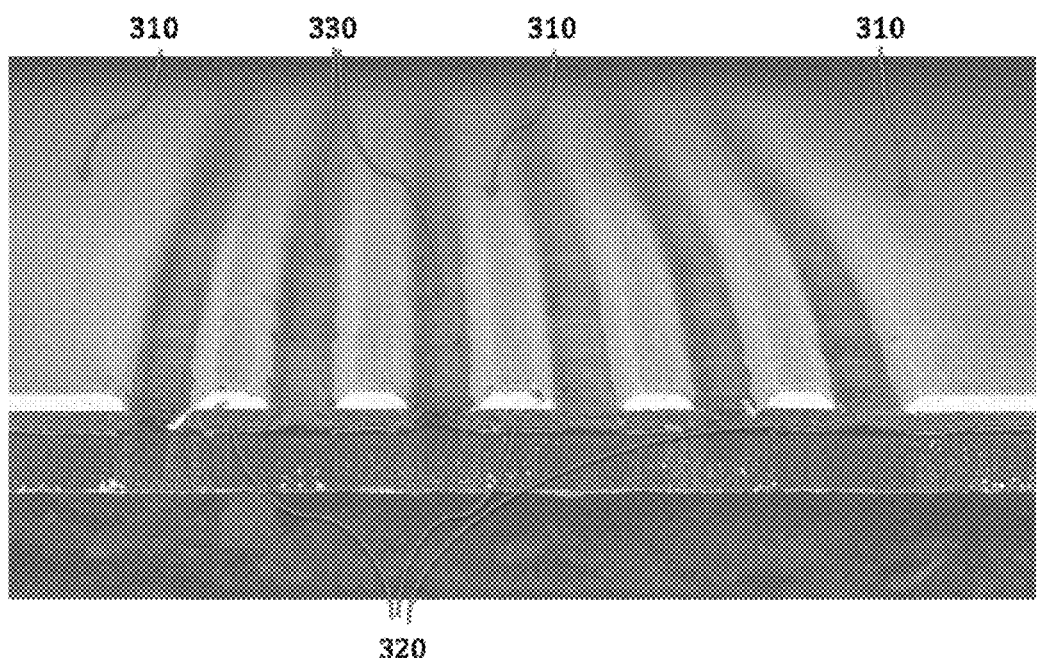
FIG. 3 is an SEM image of a thin layer of metal, in this case platinum, on a flexible polymer substrate that was patterned according to the invention described here.

FIG. 3 is an SEM photograph of Platinum (310) bonded to a thin sheet of biocompatible polymer (320). The Platinum was removed in strips (330) from the biocompatible polymer down to, but not into, the surface of the polymer. Here is an example of machining a higher ablation threshold material (Platinum) from a substrate (polymer) with a lower ablation threshold in a manner that does not damage the surface of the substrate, does not result in delamination of adjacent structures, and does not compromise the plasticity of materials adjacent to the zone of separation using this invention.

The invention has been described with reference to exemplary embodiments. However, it will be readily apparent to those skilled in the art that it is possible to embody the invention in specific forms other than those of the embodiments described above. This may be done without departing from the spirit of the invention. The exemplary embodiments are merely illustrative and should not be considered restrictive in any way. The scope of the invention is given by the appended claims, rather than the preceding description, and all variations and equivalents which fall within the range of the claims are intended to be embraced therein.

The invention claimed is:

1. A method of separating two layers of material on a substrate in at least a portion of an interface between them comprising:

thinning at least a portion of one of the layers of material on the substrate by ablation with electromagnetic radiation; and directing an evanescent wave of electromagnetic radiation into the interface.

* * * * *